Sept. 21, 1926.
R. A. L. BOGAN
HEATER VALVE
Filed April 29, 1926
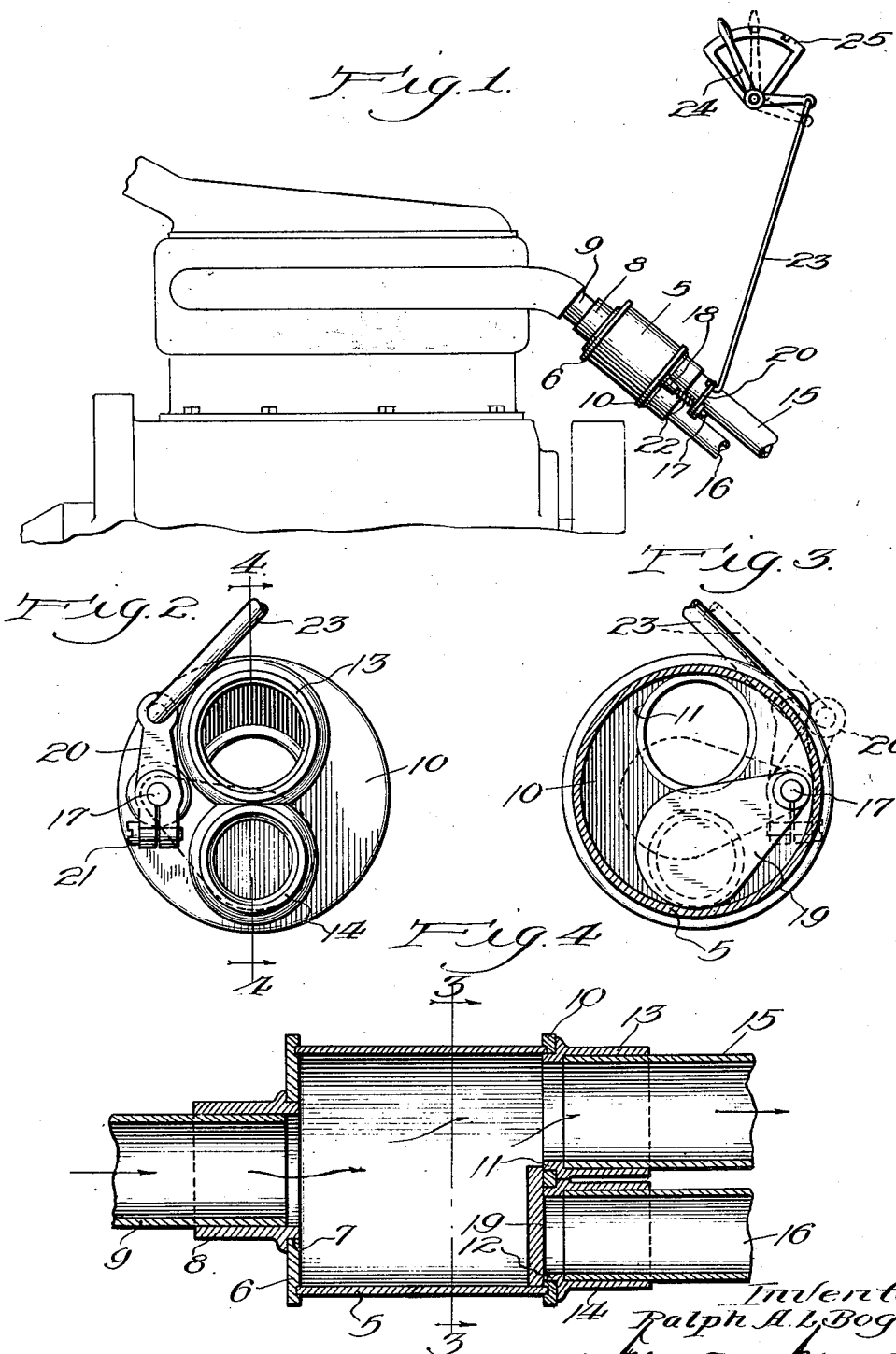
Inventor:
Ralph A. L. Bogan Patented Sept. 21, 1926.

1,600,793

UNITED STATES PATENT OFFICE.

RALPH A. L. BOGAN, OF HIBBING, MINNESOTA.

HEATER VALVE.

Application filed April 29, 1926. Serial No. 105,402.

This invention relates to a valve for interposition in the exhaust line of an internal combustion engine to divert a desired portion of the heated products of combustion through a pipe having connection with a heater. The construction entering into the present valve renders it particularly suitable for large capacity engines such as those which are used to propel busses, trucks, and the like, although it may be employed elsewhere with considerable advantage.

For its objects my invention aims to provide a valve structure which is compact, simple, and effective for diverting exhaust gases for purposes of operating a heater of any approved kind. More particularly the present valve is designed to handle the exhaust of a motor without causing any appreciable back pressure such as tends to produce an excess of temperature in certain of the engine cylinders. An exemplification of the valve in its preferred form is illustrated in the accompanying drawing wherein—

Figure 1 which is a view in elevation shows the valve structure operatively connected to an internal combustion engine;

Fig. 2 is an elevation looking toward the exit end thereof;

Fig. 3 is a transverse section therethrough on line 3—3 of Fig. 4; and

Fig. 4 is a longitudinal section taken on line 4—4 of Fig. 2.

In the form shown the valve structure comprises a cylindrical chamber formed by a drum 5 having at one end a head plate 6 provided with an intake opening 7 therein. A collar 8 surrounding this opening is associated with the head plate for connection with the engine exhaust line 9. It is preferable that the valve be connected relatively close to the engine. At the opposite end of the body is a second head plate 10 having therein two exit openings 11 and 12 surrounded by outwardly extending collars 13 and 14, respectively. Connected to the collar 13 is a pipe 15 which may lead to a heater (not shown). A second pipe 16 which is joined to the collar 14 is designed to carry the exhaust directly to the atmosphere. For best results the collar 13 may be of slightly greater diameter than the collar 14 which defines the passage for the delivery of the exhaust gases to the atmosphere.

The two openings 11 and 12 are shown as aligned with the axis of the head plate 10. This arrangement permits a valve stem 17 to be entered through a bearing collar 18 in the head plate to support adjacent its inner side a valve plate 19 which is movable to close either exit opening.

The stem 17 on which the valve plate is mounted fast extends exteriorly of the bearing collar to receive an operating arm 20 which may be clamped tightly thereon with the aid of a screw 21. Interposed between the bearing collar and this arm is a compression spring 22 which exerts an outward pressure upon the stem such as to hold the valve plate closely against the inner face of the head plate 10. Manipulation of the valve may conveniently be performed by attaching to its operating arm a rod 23 having connection with a control lever 24 which is mounted upon a quadrant 25. This control may be located at a point which is convenient to the driver whereby the valve may be manipulated at will.

A valve having the characteristics noted requires no attention whatever in service. It consists of but few parts which are subjected to little or no wear. The course of travel of the exhaust gases when passing into the heater is indicated by the arrows in Fig. 4. An intermediate position of the valve plate is shown in dotted lines in Fig. 3. Manifestly the valve may be placed in any other desired position within its movement limits, by proper manipulation of the control lever.

The present heater valve has been found in practice to be very efficient. It provides between the intake pipe 9 and the take-off pipes 15 and 16 a chamber of appreciable size to permit expansion of the gases sufficient to eliminate the back pressure tendencies resulting from the presence of a fitting in the exhaust line. By placing such a heater valve close to the exhaust manifold of the engine, I am enabled to obtain the greatest efficiency, and at the same time subject the motor to no undesirable temperature effects.

I claim:

1. In combination with an internal combustion engine, a heater valve connected to receive the exhaust gases therefrom, the valve comprising a body in the form of a cylindrical drum with plates closing the two ends thereof, there being in one end plate an intake opening and in the other end plate two outlet openings whereby the travel of the exhaust gases is straight through the drum, a valve plate slidably mounted within the drum adjacent the outlet end plate thereof and adapted to move across either opening to close off the passage therethrough, the valve plate bearing against the outlet end plate in all adjusted positions whereby to receive a backing therefrom in resistance to the force of the exhaust gases proceeding through the drum, a stem made fast to the valve plate and extended to the exterior of the body, spring means surrounding the stem and bearing against the body to hold the valve plate closely adjacent the outlet end thereof, and means connected to the stem imparting swinging movements to the valve plate, substantially as described.

2. In combination with an internal combustion engine, a heater valve connected to receive the exhaust gases therefrom, the valve comprising a cylindrical drum with circular plates at opposite ends thereof, there being in one plate an intake opening and in the other plate two outlet openings whereby travel of the exhaust gases may proceed straight through the drum, a valve plate arranged adjacent the inner side of the outlet end plate and adapted to close either opening therein, a stem connected fast to the valve plate for sliding the latter across the adjacent end plate from one outlet opening to the other, a spring surrounding the stem tending to hold the valve plate close against the outlet end plate, and means exteriorly of the valve connected to the stem for imparting movements thereto, substantially as described.

RALPH A. L. BOGAN.